1,960,662

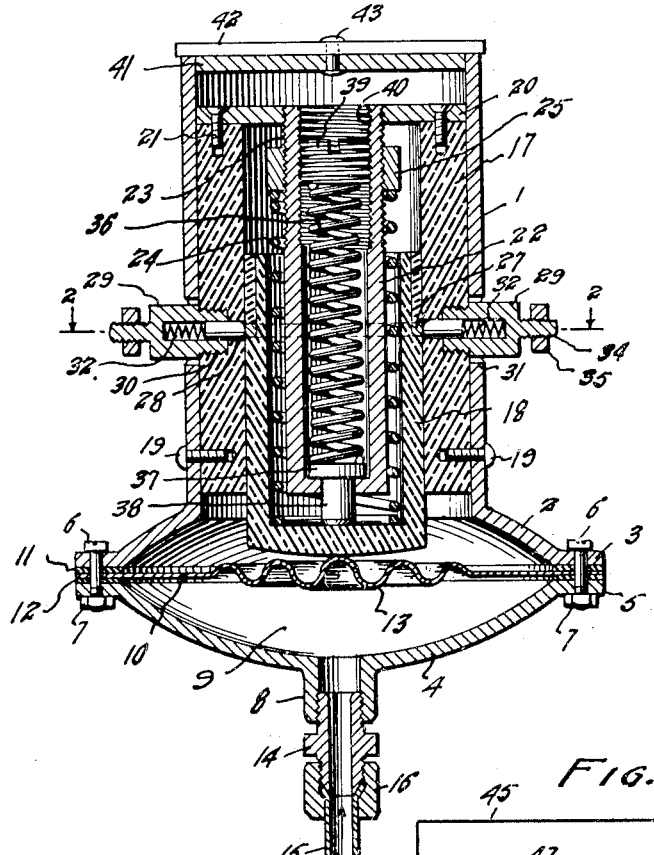
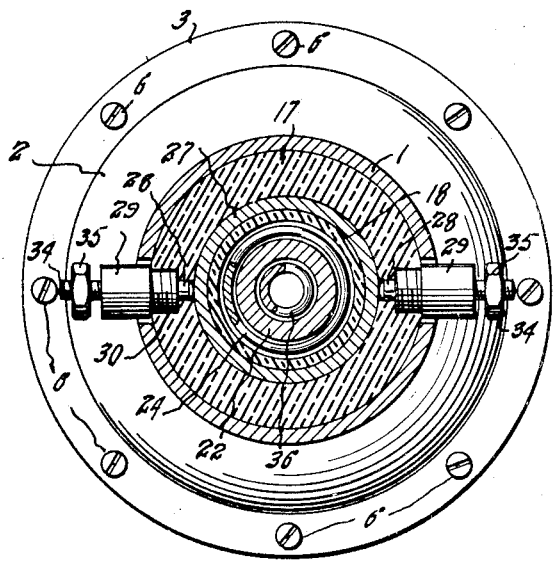
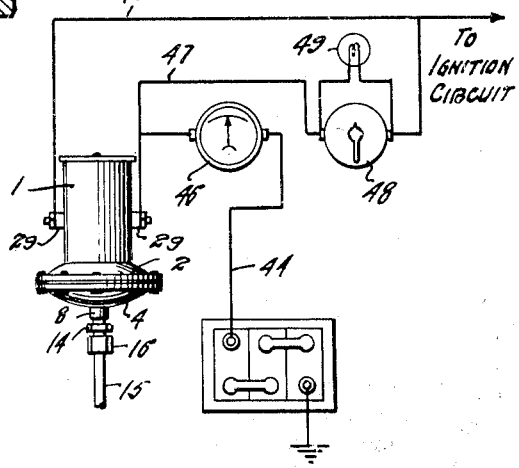
Inventors
FRANK E. COMO &
JOSEPH A. FARRAR
By Semmes & Semmes
Attorneys Patented May 29, 1934

UNITED STATES PATENT OFFICE 1,960,662

PRESSURE IGNITION SWITCH

Frank E. Como and Joseph A. Farrar,
Ware, Mass.

Application February 19, 1932, Serial No. 594,128

4 Claims. (Cl. 200—83)

This invention relates in general to electrical connecting devices and more particularly has reference to a pressure ignition switch for internal combustion engines having pressure lubricating systems.

Previous to this time very great damage to an internal combustion engine has usually resulted from a failure of the lubricating system with continued operation of the motor.

In the normal operation of internal combustion engines having pressure lubricating systems, such as those commonly employed in automotive vehicles and airplanes, a substantially constant oil pressure is maintained under normal operating conditions. The falling or rising of the pressure, therefore, to any appreciable degree is generally indicative of a fault in the lubricating system which may result in damage to the motor if its operation is continued.

Oil leaking out of a closed pressure lubricating system or being consumed therein will give rise to a decrease in the pressure. Oppositely, upon a conduit or bearing becoming clogged, the pressure may increase. Also, frozen radiators or blocks, diluted oil or a lubricant of abnormal viscosity may affect the pressure to indicate that the operation of a motor should be discontinued. Manifestly, such conditions of abnormally high or low pressure are danger signals as respects damage to the motor if its operation is continued.

In the present practice, pressure gauges are commonly provided for the observation of the operator of an internal combustion engine, such as in airplanes and automotive vehicles. These merely afford a visual check on the oil pressure, however, and if not observed, or if ignored, will not act to positively prevent damage to a motor by discontinuing its operation automatically with abnormal changes in the oil pressure.

There has been provided a device for opening the ignition circuit with a decrease in the oil pressure of an internal combustion engine to discontinue its operation. This device does not include means for adjustment to operate within desirable limits of pressure and has not been adapted to function with an abnormal increase in oil pressure, so that it has been inoperative for practical purposes. Further this device did not include means for closing the ignition circuit when the oil pressure is not at normal, which, it will be appreciated, is essential under certain conditions in the use of such a device.

An object of this invention is to provide a pressure ignition switch for internal combustion engines having a pressure lubricating system, responsive to abnormal changes in the oil pressure to discontinue the operation of the motor.

Another object of this invention is to provide a pressure ignition switch for internal combustion engines having a closed lubricating system for automatically opening the ignition circuit to discontinue operation of the motor with an abnormal fall or rise in the oil pressure.

Still another object of this invention is to provide a pressure ignition switch for an internal combustion engine having a closed lubricating system adapted to open the ignition circuit to discontinue the operation of the motor with an abnormal rise in the oil pressure.

A further object of this invention is to provide a pressure ignition switch for an internal combustion engine adapted to automatically open the ignition circuit with an abnormal fall or rise in the oil pressure and having means associated therewith for closing the ignition circuit independent of pressure operation.

With these and other objects in view which may be incident to our improvements, the invention consists in the parts and combination to be hereinafter set forth and claimed, with the understanding that the several necessary elements comprising our invention may be varied in construction, proportions and arrangement without departing from the spirit and scope of the appended claims.

In order to make our invention more clearly understood, we have shown in the accompanying drawing, means for carrying the same into practical effect without limiting the improvements in their useful applications to the particular constructions, which, for the purpose of explanation, have been made the subject of illustration.

In the drawing forming a part of this specification:

Figure 1 is a side elevation sectional view of the pressure ignition switch.

Figure 2 is a top view thereof.

Figure 3 is a diagrammatic view showing the pressure ignition switch in an ignition circuit and the means for oppositely closing the ignition circuit independent of the pressure switch.

Referring more particularly by numerals to the drawing, especially to Figure 1, the pressure ignition switch comprises a tubular casing 1, terminating at the bottom in a radially extending convexedly formed portion 2, provided with a horizontal circumferential flange 3. A concavedly formed member 4 provided with a horizontal circumferential flange 5 is adapted to be fixed to the flange 3 by bolts 5 and nuts 7. The member 4 is provided with a central collared aperture 8. The members 2 and 4 convexly and concavely formed, respectively, are adapted to provide a diaphragm chamber 9. A diaphragm 10 is mounted within the chamber and fixed around its edges adjacent its periphery between the flanges 3 and 5. Washers 11 and 12 are interposed between the diaphragm and the top and bottom flanges 3 and 5, respectively, provided on the walls of the members forming the diaphragm chambers.

The diaphragm is formed with concentric corrugations 13 for the purpose of reinforcing the same. The collar 8 is threaded to receive connection 14 having the end of a pipe 15 from the pressure system of an internal combustion engine fixed on the other end by a threaded collar 16, for communicating the pressure therein to the diaphragm 10 within the chamber 9.

A body of tubular insulating material 17 is fitted within the casing 1 adapted to receive a hollow insulated movable plunger 18, the lower end of which is adapted to rest on the diaphragm 10. The body of insulating material 17 is fixed against movement within the casing 1 by screws 19 extending through the walls thereof and into the body and a top 20 is fixed on the body of insulating material 17 and secured thereto by screws 21 extending through the top 20 and into the body of material 17.

The top 20 is provided with a central threaded aperture for receiving a stationary hollow tube 22 fitted within the movable plunger 18. The tubular member 22 is externally threaded adjacent the top for screwing in the aperture on the top 20 as at 23.

A helical spring 24 is adapted to be mounted over the tubular member 22, the lower end of the spring resting on the bottom of the movable hollow plunger 18 and the upper end of the spring held by a threaded collar 25 screwed over the tubular member 22 which is also externally threaded as already mentioned.

It will be appreciated from the foregoing that upward movement of the plunger 18 caused by movement of the diaphragm 10 on which it is adapted to rest will compress the spring 24 which is normally adapted to maintain the plunger 18 seated on the diaphragm 10. The tension of the spring 24 is adapted to be regulated to afford any desired adjustment to adapt the diaphragm and movement of the plunger 18 caused thereby to any desirable pressure.

A metal contact ring 27 is fixed on the plunger 18 with the periphery thereof flush with that of the plunger. A plurality of contacts 28 are oppositely mounted on the walls of the casing 1, on the same horizontal plane adapted to make contact with the ring 27 when the same is positioned in the same horizontal plane therewith. The contacts 28 are fixed against vertical movement while the ring 27 mounted on the plunger 18 is adapted to move vertically therewith. The tension of the spring 24 is adapted to be adjusted by operation of the collar 25 so as to control the movement of the diaphragm 10 in such a manner that the ring 27 will lie in the same horizontal plane as the contacts 28 so as to contact therewith, when the diaphragm is distended under a normal pressure.

The contact members 28 are slidably mounted in apertures provided in holders 29. The holders 29 are formed with reduced threaded extensions 30 on the inner ends for being fitted through apertures 31 provided in the walls of the casing 1 and screwed in threaded seats in the body of insulating material 17. The threaded seats are provided with reduced apertures communicating with the interior walls thereof for receiving the contacts 28. The contacts 28 are adapted to be held against the plunger 18 by the springs 32. The outer ends of the holder members 29 are formed with reduced threaded extensions 33 for receiving nuts 35 to provide terminal binding posts for connection with the conductors in any ignition circuit.

It will be appreciated that a circuit through the contacts 28 is only adapted to be completed when the same are in contact with the ring 27 on the plunger 18 so that when the contact ring 27 does not lie in the same horizontal plane therewith the circuit is open. The tension of the spring 24 is adapted to be so adjusted that when the diaphragm 10 is distended under a normal pressure admitted through the line 15, the plunger 18 will be raised so as to bring the ring 27 into the same horizontal plane as the members 28, to contact therewith and complete a circuit.

In the operation of the device a rise or fall of the normal pressure for which the switch is adjusted to operate will cause the diaphragm 10 to further extend or contract to either raise the plunger 18 against the tension of the spring 24 or for the plunger to be lowered by the pressure exerted by the spring without the support of the diaphragm. Movement of the plunger, either up or down will bring the contact ring 27 out of the same horizontal plane as the contacts 28 so as to open the circuit in which the switch is interposed and discontinue the operation of a motor before any damage can result from the fault in the lubricating system causing a rise or fall in the pressure.

In addition to the spring 24 for positively lowering the plunger 18 when the diaphragm contracts by reason of a fall in the pressure, a helical spring 36 is mounted within the fixed tubular member 22. The lower end of the spring 36 is adapted to rest on a collar 37 formed on a button extending through a central aperture provided in the bottom of the tubular member for being contacted by the bottom of the plunger 18. The tension of the spring 36 is adapted to be adjusted by a threaded plug 39 screwed in the top of the tubular member 22, the upper portion of which is internally threaded as at 40.

The provision of the spring 36 is made for the purpose of retaining the contact ring 27 on the plunger in electrical connection with the contacts 28 under normal pressure by contact of the button 38 with the bottom of the plunger. Under normal conditions the plunger does not raise the button 38 as it is held down by the spring 36 so as to maintain the contact ring in the same horizontal plane as the contacts 28. With an abnormal increase in the pressure, however, extending of the diaphragm 10 beyond the normal so as to further raise the plunger will cause the contact ring to be raised out of a horizontal plane with the contacts 28 by the bottom of the plunger raising the button against the tension of the spring 36.

For example, in the use of the switch, if a line carries sixty pounds pressure under normal operating conditions, the lower pressure cut off adjustment may be set at six pounds independent of the high pressure adjustment which may be adjusted to cut out at sixty-five pounds, which condition is obtained by adjusting the tension of the spring 36 to operate at over sixty-five pounds pressure. At low oil, or no oil, pressure, the high pressure adjustment does not affect adjustment of the switch as it only functions at excess pressure but is essential in order to secure wide variation of adjustment for which the switch is adapted.

The casing 1 enclosing the plunger 13 and tubular member 22 and springs 24 and 36, is adapted to be closed at the top by suitable closure 41, which may fit flush with the edges and engage the inner periphery of the casing adjacent its rim. A cap 42 is concentrically mounted on the top 41 and fixed thereto by a rivet 43 for securing the top and the closure, which may be screwed or otherwise fixed in place.

The switch, as has been inferred, is adapted to be interposed in the ignition circuit of an internal combustion engine having a pressure lubricating system, as for example, as is illustrated in Figure 3, wherein one contact 28 on the switch is shown connected by a conduit 44 to one terminal of the battery and a lead 45 to the ignition circuit connected to the other contact 28. A conventional ammeter 46 is shown interposed in the conduit 44.

As a novel feature of the invention there is shown a conduit 47 connected across the switch between the leads 44 and 45. A switch 48 is interposed in the conduit 47 and an indicator, such as a light 49, connected to the conduit 47 across the switch 48. The switch 48 is adapted to provide for closing the ignition circuit when opened by the pressure switch under the conditions where the operation of the motor is essential notwithstanding the oil pressure. The light 49, or other indicator, is adapted to show when the ignition circuit is closed through the manual switch 48 without respect to the pressure in the lubricating system.

Cutting off of the pressure switch through an abnormal fall or rise in the pressure will be attended by a skipping of the motor so as to afford a warning before the final cessation of operation which will allow the switch 48 to be closed so as to continue the operation of the motor if this should be desirable under emergency conditions such as may be encountered in an airplane or where it is otherwise essential to continue the operation of a motor for a short period.

The pressure switch may be connected to one side of the self-starter circuit to enable instant cold weather or other hard starting independent of, but combined with, the manual switch for emergency operation for the displaying of a signal when the starter is used or the manual switch is operative, either intentionally or accidentally.

Further another marked advantage of the pressure switch is that the switch key of an automotive unit may be left on with no injury to the coil, condenser or battery, as when the motor is not running, the electric circuit is always open except when closed by the switch 48 under which condition the indicator 49 is operative to advise of the fact.

There is accomplished by this invention a pressure ignition switch for internal combustion engines having a pressure lubricating system adapted to prevent damage to such motors by automatically discontinuing operation of the same with a fault in the lubricating system causing an abnormal fall or rise in the oil pressure and with a supplementary manual switch associated therewith for the ignition circuit independent of the oil pressure under emergency conditions, the latter having an indicator associated therewith for showing the operation of the manual switch.

While we have shown and described the preferred embodiment of our invention, we wish it to be understood that we do not confine ourselves to the precise details of construction herein set forth by way of illustration, as it is apparent that many changes and variations may be made therein by those skilled in the art without departing from the spirit of the invention, or exceeding the scope of the appended claims.

We claim:

1. A circuit breaking device comprising a casing, an insulator sleeve slidable under spring tension in the casing, a conductor ring carried on the sleeve, contacts mounted in the casing for completing a circuit through the ring, and pressure operated means for normally aligning the ring with the contacts against spring tension.

2. A circuit breaking device comprising a casing, an insulator sleeve slidable under spring tension in the casing, a conductor ring carried on the sleeve, contacts mounted in the casing for completing a circuit through the ring and a pressure operated diaphragm for aligning the ring with the contacts within the range of a normal pressure against spring tension.

3. A circuit breaking device comprising a casing, an insulator sleeve slidable under spring tension in the casing, a conductor ring carried on the sleeve flush with the periphery thereof, contacts mounted in the casing for completing a circuit through the ring, and a pressure operated diaphragm for maintaining the ring in engagement with the contacts under a normal pressure against spring tension.

4. A circuit breaking device comprising a casing, an insulator sleeve insulated therefrom and slidable therein a helical spring therein to normally hold the sleeve down, means for adjusting the tension of the sleeve, a conductor ring carried on the sleeve, flush with the periphery thereof, contacts mounted in the casing for completing a circuit through the ring, a pressure operated diaphragm having annular grooves and ridges for engaging the end of the sleeve and maintaining the ring in engagement with the contacts within the range of a predetermined pressure and a helical spring to further retard upward movement of the sleeve when the contacts engage the ring.

FRANK E. COMO.
JOSEPH A. FARRAR.